Aug. 5, 1969 T. M. PATELLARO 3,459,450
CHILD'S AUXILIARY SEAT
Filed Feb. 23, 1967
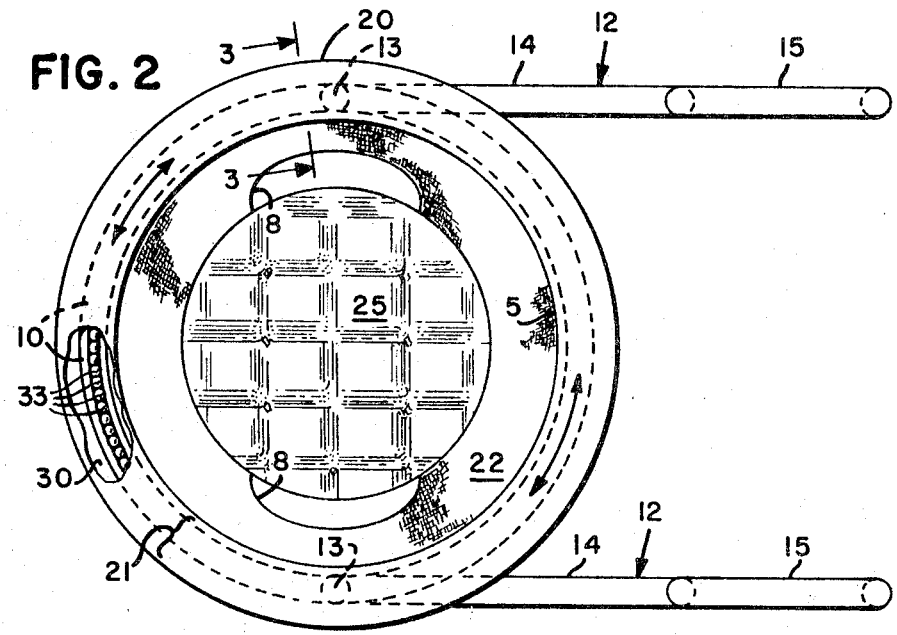
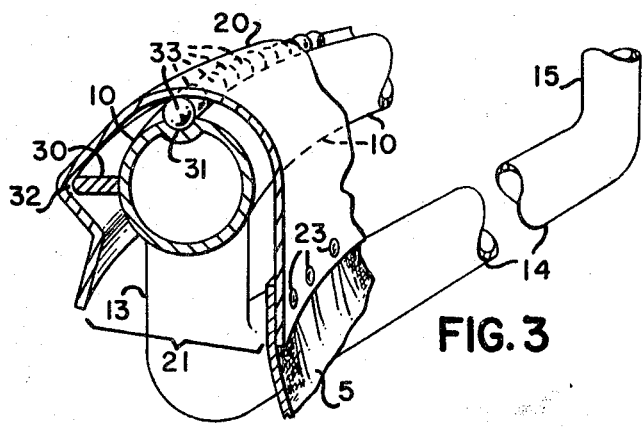
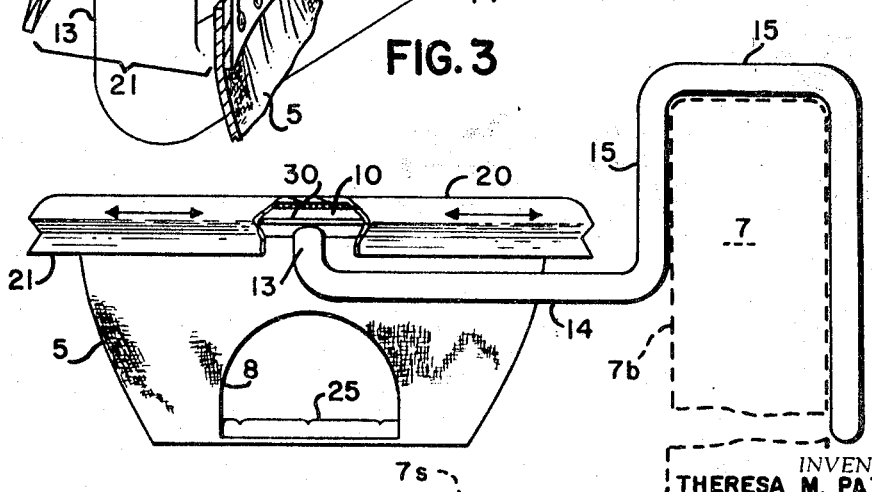
INVENTOR.
THERESA M. PATELLARO
BY *jack M. Wiseman*
ATTORNEY United States Patent Office 3,459,450
Patented Aug. 5, 1969

3,459,450
CHILD'S AUXILIARY SEAT
Theresa M. Patellaro, 2037 Randolph Drive,
San Jose, Calif. 95128
Filed Feb. 23, 1967, Ser. No. 617,979
Int. Cl. A47d 1/10
U.S. Cl. 297—254       4 Claims

ABSTRACT OF THE DISCLOSURE

A child's auxiliary seat having a stationary ring supported on the back of an adult-size automobile or other seat. The child is seated in a flexible basket-shaped seat member which is attached to a movable ring supported by and concentric with the stationary ring so that the seat member can rotate 360° in either direction.

---

The present invention relates to a child's auxiliary seat which is supported by the back of an adult-size seat as, for example, in an automobile.

Presently available child's auxiliary seats suffer from the disadvantage that they severly restrict the child's movement. Accordingly, children in such seats tend to become restless and irritable. This is not only unpleasant and annoying, but in the case of an automobile, can distract the driver and create a serious driving hazard.

An object of the present invention is to provide an auxiliary seat which permits the child to move sufficiently to obtain substantial exercise and look around in all directions, thereby maintaining the child in an amused and content state for long periods of time, while at the same time prohibiting lateral movement of the child along the adult seat.

Another object of the present invention is to provide an auxiliary seat for a child in which the seat member can rotate 360° in either direction.

In a preferred embodiment of the invention, a stationary ring is supported on the back of an adult seat, and the child's seat is attached to a concentric ring which surrounds said stationary ring and is supported in reversably rotating relationship therewith.

The various features and advantages of the present invention will become more apparent upon a consideration of the following description taken in connection with the accompanying drawing, wherein:

FIGURE 1 is a side elevation view, partly in section, of an auxiliary seat embodying the present invention, shown as supported from the back of an adult seat;

FIGURE 2 is a top plan view, partly broken away, of the auxiliary seat of FIGURE 1; and FIGURE 3 is a cross-sectional view taken along line 3—3 in FIGURE 2.

Referring to the drawing, a flexible basket-shaped member 5, adopted for seating a child therein, is supported by a pair of hanger brackets 6 on the back 7b of an adult-size seat 7 (shown in phantom in FIGURE 1). In the exemplary embodiment, the seat member 5 is made from a web-like material so as to conform to the contour of the body seated thereon. The seat 7 may, for example, be an automobile seat. In the preferred embodiment, the free ends of the brackets 6 extend substantially to the floor so as to afford greater holding security to the user, particularly when bracket rests are used for automobiles.

The child's seat 5, having diametrically-opposed openings 8 for permitting the child's legs to extend therethrough, is positioned by the brackets 6 above the horizontal seating surface 7S of the adult's seat 7 so that the child's feet rest comfortably on the seating surface 7S. By pushing with his feet on the seating surface 7S, the child is able to rotate the seat member 5 by 360° in either direction, by a mechanism which will now be described.

The hanger brackets 6 are connected to a stationary inner tubular ring 10. Each bracket 6 comprises a portion 13 which is attached to the bottom of ring 10 at diametrically-opposed points spaced laterally of the seat 7. Each tube portion 13 projects radially downward with reference to the cross-section of ring 10 (see FIGURE 3) and then joins a rearwardly-extending tube portion 14. The rear end of each tube portion 14 joins a tube portion 15 which extends upward along the back 7b of the seat 7, and then hooks over the top of the back 7b in a conventional manner. Each bracket 6 may be conveniently formed into the portions 13, 14 and 15 by bending a single piece of metal tubing, for example aluminum tubing. Inner ring 10 may also be made from aluminum tubing.

The inner ring 10 is surrounded by a concentric outer ring 20 which has a circular opening or slot 21 in the bottom surface thereof. The ring 20 may, for example, be made from sheet aluminum. The basket-shaped seating member 5 is attached at the rim thereof to the inner wall of slot 21, as by rivets 23 (see FIGURE 3). The seat 5 may, for example, be made of a fabric such as a flexible web-like material or vinyl and have a padded bottom 25, when desired.

The outer ring 20 is supported in reversably-rotating relationship relative to the stationary inner ring 10. To accomplish this, inner tube 10 has a radially-projecting annular flange 30 (made, for example, of aluminum) attached thereto, and a circular notch or indentation 31 projecting radially-inward from the top surface thereof (see FIGURE 3). The flange 30 is inserted at the free end thereof into a circular notch or indentation 32 projecting radially-outward from the outside surface of the outer ring 20, thereby forming a vertically-loaded bearing. The notch 31 forms a race for ball rollers 33 which engage both the outer surface of ring 12 to form a horizontally-loaded bearing. The notched bearings at 31 and 32 bear the weight of the seat 5 while permitting the outer ring 10 to be rotated relative to stationary inner ring 20 by 360° in either direction. It is to be noted that the bracket portion 13 which is attached to inner ring 10 extends through the bottom slot 21 of the outer ring 20 so as not to impede this rotation.

While reference to a ring 20 is made herein, it is apparent that a flat top could be employed as well.

In use, the seat is mounted on the back 7b of the adult seat 7 by means of the hanger brackets 6, and the child is placed therein with his legs extending through the openings 26 and his feet resting on the horizontal surface 7S of the adult seat 7. The bracket 6 prohibits the child's movement laterally of the seat 7. However, by pushing with his feet on the seat surface 7S, the child can cause the outer ring 20, carrying his seat 5, to rotate relative to the stationary ring 10, and thereby revolve himself through 360° in either direction about the common axis of rings 10 and 20. The outer ring 20, which revolves with the child, provides an arm rest in any position of rotation.

It is to be understood that modifications and variations of the embodiments of the invention disclosed herein may be resorted to without departing from the spirit of the invention and scope of the appended claims.

Having thus described my invention, what I claim as new and desire to protect by Letters Patent is:

1. A child's auxiliary seat comprising: a seating device in which a child may be seated; supporting means engaging the back of an adult's seat for positioning said seating device above the sitting surface of said adult's seat so that the legs of a child placed in said seating device will extend from said seating device and the feet of said child may rest on said adult's sitting surface; and rotatable means supported by said supporting means and reversibly rotatable with respect to said supporting means, said seating device being attached to said rotatable means to permit said child to rotate said seating device in either direction by pushing with his feet on said sitting surface, said supporting means comprising a stationary ring, said rotatable means comprising a ring concentric with and rotatable with respect to said stationary ring, said rotatable ring surrounds said stationary ring to be supported thereby, said rotatable ring being formed with a circular slot around the bottom thereof, said supporting means also comprising rigid members extending through said slot and connected to said stationary ring for supporting said stationary ring in position, said rigid members having hook portions adapted to engage the back of an adult's seat and portions extending from the back of the adult's seat with the distal ends of said extending portions spaced above the seating surface of the adult's seat and spaced from the back of the adult's seat, said rotatable ring being rotatable 360° in either direction with respect to said stationary ring.

2. A child's auxiliary seat according to claim 1, including a circular indentation about the outside surface of said stationary ring, roller balls positioned in said indentation and engaging the inside surface of said rotatable ring in rotation bearing relationship therewith, a circular indentation about the inside surface of said rotatable ring, and a flange attached to, and extending from, said stationary ring, said flange having a free end seated in said circular indentation in said rotatable ring in rotation bearing relationship therewith.

3. A child's auxiliary seat according to claim 2 wherein the circular indentation of said stationary ring is disposed on the top surface of said stationary ring, and the circular indentation of said rotatable ring is disposed on the outer surface of said rotatable ring.

4. A child's auxiliary seat according to claim 1 wherein said seating device is a basket-shaped member attached at the rim thereof to said rotatable ring, said basket-shaped member having opposed openings therein for the child's legs.

References Cited

UNITED STATES PATENTS

| | | | |
|---|---|---|---|
| 1,584,161 | 5/1926 | Bear | 297—254 |
| 1,688,922 | 10/1928 | Drinosky | 297—5 |
| 2,675,858 | 4/1954 | Cotter | 297—255 |
| 3,094,356 | 6/1963 | Burke | 297—349 |
| 3,144,273 | 8/1964 | P'Simer et al. | 297—254 |

FOREIGN PATENTS 1,382,316   11/1964   France.

FRANCIS K. ZUGEL, Primary Examiner

U.S. Cl. X.R.

297—349